United States Patent
Mondry et al.

(10) Patent No.: US 11,212,605 B1
(45) Date of Patent: Dec. 28, 2021

(54) MICROPHONE BRACKET FOR COSMETIC PORT WITH NO MESH

(71) Applicant: Apple Inc., Cupertino, CA (US)

(72) Inventors: Michael K. Mondry, San Francisco, CA (US); Allegra Shum, San Carlos, CA (US); Brian A. Argyres, Palo Alto, CA (US); Benjamin J. Pope, Mountain View, CA (US); Sherry Cao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 29 days.

(21) Appl. No.: 16/988,568

(22) Filed: Aug. 7, 2020

(51) Int. Cl.
| | | |
|---|---|---|
| *H04R 1/08* | (2006.01) | |
| *H04R 1/28* | (2006.01) | |
| *H04M 1/03* | (2006.01) | |

(52) U.S. Cl.
CPC ............ *H04R 1/083* (2013.01); *H04M 1/035* (2013.01); *H04R 1/283* (2013.01); *H04R 2499/11* (2013.01)

(58) Field of Classification Search
CPC .... H04R 1/083; H04R 1/283; H04R 2499/11; H04M 1/035
See application file for complete search history.

(56) References Cited

U.S. PATENT DOCUMENTS

| | | |
|---|---|---|
| 7,280,855 B2 | 10/2007 | Hawker et al. |
| 10,015,574 B1 | 7/2018 | Luce et al. |
| 10,148,800 B1 | 12/2018 | Frederickson et al. |
| 2012/0093350 A1 | 4/2012 | He et al. |
| 2012/0106766 A1 | 5/2012 | Kuroda |
| 2013/0070950 A1 | 3/2013 | Chen |
| 2013/0129133 A1* | 5/2013 | Inoda ........................ H04R 1/08 381/337 |
| 2013/0222192 A1 | 8/2013 | Seo et al. |
| 2013/0251183 A1 | 9/2013 | Doller et al. |
| 2014/0079263 A1 | 3/2014 | Chang et al. |
| 2014/0140533 A1* | 5/2014 | Malek ..................... H04R 1/086 381/91 |
| 2014/0254836 A1 | 9/2014 | Tong et al. |
| 2015/0198271 A1 | 7/2015 | Wright |
| 2016/0073194 A1* | 3/2016 | Auclair .................. H04R 1/023 381/345 |
| 2017/0070795 A1* | 3/2017 | Meyer .................... H04R 1/023 |
| 2017/0082067 A1 | 3/2017 | Maqbool |

* cited by examiner

*Primary Examiner* — Tuan D Nguyen
(74) *Attorney, Agent, or Firm* — Kilpatrick Townsend & Stockton LLP

(57) ABSTRACT

An electronic device including a housing comprising one or more walls that define an interior cavity and that include a first wall having an audio opening extending through the first wall from an exterior surface of the housing to the interior cavity; a bracket disposed within the interior cavity and having first and second opposing surfaces, a first channel extending along the first surface and having a first end spaced apart from and surrounding the audio opening, and a second channel fluidly coupled to and extending perpendicular to the first channel through the second surface at a location laterally displaced from the audio opening; and a microphone disposed within the interior cavity and coupled to the second surface of the bracket over the second channel, wherein the bracket cooperates with the first wall to create an acoustic pathway that extends from the audio opening through the first wall, through the first channel and through the second channel to the microphone.

20 Claims, 5 Drawing Sheets

MICROPHONE BRACKET FOR COSMETIC PORT WITH NO MESH

FIELD

This disclosure generally applies to electronic devices that include a microphone.

BACKGROUND

Portable electronic devices, such as tablet computers, smart phones, smart watches, media players and the like each typically include one or more microphones for capturing audio signals by converting sound waves into electrical energy that can be transmitted, recorded or otherwise processed. For example, a microphone can be disposed within a housing of the portable electronic device and an opening in the housing can allow sound waves to reach the microphone causing a diaphragm of the microphone, a membrane, to vibrate which in turn can produce a varying electric current that represents the sound waves.

In general, portable electronic devices are often designed to be small and compact to enhance portability and microphones used in such portable devices typically include a mesh covering disposed over an audio opening in a device housing to prevent dust, debris, and other foreign objects from reaching the microphone membrane. The use of mesh coverings, however, can result in size constraints that undesirably limit product design.

In addition, the mesh covering can get clogged by the foreign objects it is designed to trap which can lead to decreased performance of the microphone since audio waves cannot penetrate the foreign objects clogging the mesh to reach the microphone membrane.

BRIEF SUMMARY

The present disclosure describes various embodiments of a portable electronic device that includes a microphone that receives audio waves through an audio opening in the device housing that does not need to be protected by a mesh covering. Instead, in some embodiments, an opening to the microphone diaphragm can be laterally displaced from the audio opening and the portable electronic device can include a bracket disposed between the audio opening and the microphone that creates a non-linear acoustic pathway from the audio opening to the microphone.

In some embodiments, an electronic device is disclosed that includes, among other elements, a housing, a bracket and a microphone. The bracket can include one or more walls that define an interior cavity and that include a first wall having an audio opening extending through the first wall from an exterior surface of the housing to the interior cavity. The bracket can be disposed within the interior cavity and have first and second opposing surfaces, a first channel extending along the first surface, a first end spaced apart from and surrounding the audio opening, and a second channel fluidly coupled to and extending perpendicular to the first channel through the second surface at a location that is laterally displaced from the audio opening. The microphone can be disposed within the interior cavity and be coupled to the second surface of the bracket over the second channel. The bracket can cooperate with the first wall of the interior cavity to create an acoustic pathway that extends from the audio opening through the first wall, the first channel, and the second channel to the microphone.

In various implementations, the electronic device can further include one or more of the following features. The first channel can include a second end that is opposite the first end where the second channel extends away from the second end of the first channel. The audio opening can be a pinhole opening with a diameter less than two millimeters or with a diameter less than one millimeter. The second channel can be laterally displaced from the audio opening by a distance that is equal to or greater than the diameter of the audio opening. The first channel can have a length that is at least twice as long as its width and height. The acoustic pathway can have a substantially constant cross-sectional area from the audio opening through the second channel. The acoustic pathway can have a circular cross-section formed from the audio opening to the first channel through the second channel and a rectangular cross-section formed in the first channel. A hydrophobic membrane can be disposed in the acoustic pathway between the bracket and the microphone. The hydrophobic membrane can be disposed directly above the second channel. The microphone can include a diaphragm and a microphone opening can be disposed directly above the hydrophobic membrane. The microphone can be fluidly coupled to the diaphragm. The bracket can include a solid surface positioned above the audio opening which partially defines the first channel. The bracket can also include a first and second alignment pins that extend away from the second surface towards the microphone. And, the microphone can include a plate with first and second cutouts sized to accept the first and second alignment pins of the bracket.

In some embodiments, an electronic device is disclosed that includes a housing with a housing wall that includes an opening that extends from an exterior surface of the housing to an interior surface that is defined by the housing where a bracket is disposed within the interior cavity. The bracket can have a first surface that opposes a second surface where the first surface can include a shelf that is spaced apart from and positioned directly opposite the opening with a footing vertically displaced from and surrounds the shelf that is coupled to an interior surface of the housing wall at a location that surrounds the opening. The bracket can further include a passageway that extends through to the second surface and is fluidly coupled to and laterally displaced from the opening. The electronic device can also include a microphone disposed within the interior cavity that is coupled to the second surface of the bracket where the bracket creates an acoustic pathway that extends from the opening around the shelf through the acoustic pathway to the microphone. In some embodiments, the electronic device can further include a hydrophobic membrane that is disposed in the acoustic pathway between the bracket and the microphone; the acoustic pathway can have a substantially constant cross-sectional area along a length of the acoustic pathway from the opening to the microphone; and/or the opening can have a diameter less than or equal to one millimeter.

In some embodiments, an electronic device is disclosed that includes a housing having a wall that least partially defines an interior cavity and an audio opening having a diameter that is less than one millimeter and that extends away from an exterior surface of the wall to an interior cavity where the audio opening may. The electronic device can further include a microphone disposed within the interior cavity and a bracket that is coupled between an interior surface of the wall and the microphone. The bracket can have a first opening formed in the first major surface that is disposed directly over the audio opening and a second opening formed on a second major surface that is opposite the first major surface. The second major surface can be laterally displaced from the audio opening by at least the diameter of the audio opening and an audio channel can fluidly couple the first opening to the second opening. The electronic device can further include a hydrophobic membrane is disposed between the microphone and the bracket in an opposing relationship with the second opening and the bracket can cooperate with the wall of the housing to create an acoustic pathway that extends from the audio opening, through the audio channel, through the hydrophobic membrane and to the microphone. In some implementations, the acoustic pathway can have a substantially constant cross-sectional area along a length of the acoustic pathway from the audio opening to the microphone, the first opening can be part of the first channel that extends along a length of the first major surface of the bracket, and the audio channel through the bracket can include the first channel and a second channel extending perpendicularly away from the first channel towards the second opening.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The disclosure will be readily understood by the following detailed description in conjunction with the accompanying drawings in which.

DETAILED DESCRIPTION

Figure 1A:
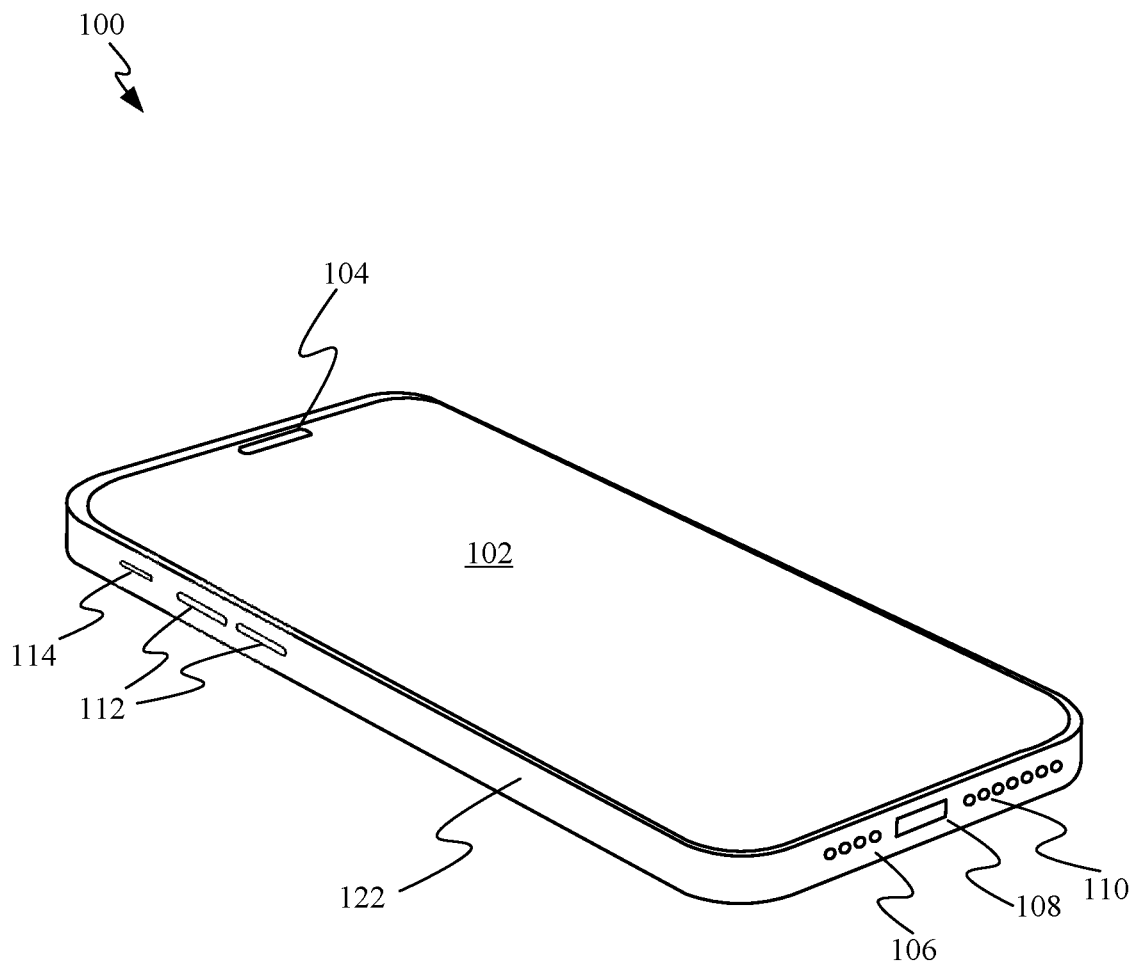
FIG. 1A illustrates a perspective view of a portable electronic device according to an embodiment of the disclosure.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessary obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A portable electronic devices is an electronic device that can operate without being coupled to a power grid by running on its own locally stored electrical power. The portable electronic device can be specifically designed to perform various function for a user and can include a microphone that detects and receives of audio waves in the form of sound and converts the audio waves to electrical signals that can be saved or otherwise processed. During normal use, the portable electronic device can be exposed to various types of wet and dry environments which can potentially damage certain components housed within the device if the components are exposed to the environments through an opening, such as a user facing port.

In order to provide robust protection for the components, a mesh covering can be used to cover some or all of the user facing ports and prevent foreign objects from reaching, contacting, and damaging the components disposed behind the covered port. However, the mesh coverings require space within the electronic device that could otherwise be used for different components and the mesh coverings can become clogged with debris encountered during normal use condition. For example, when a mesh covering is exposed to certain liquid substances, such as milk, a residue can be left behind which can clog a portion of the mesh covering that was exposed to the liquid. Once a mesh covering becomes clogged, the clogged covering can reduce the performance of the component it is designed to protect. For this reason, it can be desirable to eliminate the use of mesh coverings to protect certain components, such as but not limited to a microphone component.

Some embodiments of the disclosure pertain to a portable electronic device that includes a microphone and a hydrophobic membrane that protects internal components of the microphone from water or other liquids. The membrane can be laterally displaced from an audio opening formed in the housing of the electronic device that allows sound waves into the electronic device to reach the microphone. The electronic device can further include a bracket disposed between the audio opening and the microphone that creates, in conjunction with the audio opening, an a non-linear uninhibited acoustic pathway from the audio opening to the microphone enabling the microphone to receive sound from the external environment. The uninhibited acoustic pathway can include a first portion offset from a second portion and a shelf disposed between the first and second portions directly opposite the audio opening. In this manner the shelf can block foreign objects from reaching, contacting, and damaging the microphone membrane. The protection the bracket provides to the microphone membrane can be sufficient to allow the electronic device that the bracket is incorporated to be manufactured without a mesh covering over the microphone audio opening as would otherwise normally be used.

These and other embodiments are discussed below with references to FIG. 1-5 however, those skilled in the art will readily appreciate that the detailed description given herein with respect to these figures is for explanatory purposes only and should not be construed as limiting.

FIG. 1A illustrates a perspective view of an exemplary embodiment of a portable electronic device 100 including, a display screen 102, a port 108, and at least one button 112 all disposed about housing 122. Housing 122 includes one or more walls that form an interior cavity in which electronic components of portable electronic device 100 are housed. Housing 122 may be formed of any suitable materials including, plastic, glass, ceramics, metal, or other suitable materials or a combination of these materials. In this illustrated embodiment, display screen 102 is disposed on a front surface of housing 122 but if desired, display screen 102, can be mounted on the rear surface, side surface, a rotatable portion coupled to a surface and/or any other suitable mounting arrangement of surfaces on portable electronic device 100. Display screen 102 is configured to display information and allow for a user to interact with portable electronic device 100. In some embodiments, display screen 102 can cover the entire front surface of housing 122, where display screen 102 can extend from edge to edge. Display screen 102 can be touch sensitive and capable of receiving input by a user touching a portion of display screen 102. An opening 104 can be disposed on top of on portion of display screen 102 and can form a speaker port. Opening 104 can serve to deliver auditory information to a user. For example, opening 104 can serve as a telephone receiver that is placed adjacent to a user's ear during operation.

Port 108 is disposed on a bottom surface that is perpendicular to front surface of housing 122. Port 108 may include a multipin input-output connector or bus connector configured to receive data and power signals. For example, port 108 can be configured to receive a nine pin input connector, such as a lightning connector. In some embodiments, port 108 can be configured to receive a Universal Serial Bus (USB) type connector such as USB type A, B, or C. In some embodiments, port 108 may be disposed at a central position along the bottom surface between openings 106 and 110. Audio openings 106 and 110 may form a speaker and microphone ports. In some embodiments, audio opening 106 can be a speaker port and audio opening 110 can be a microphone port or vice versa, or audio openings 106 and 110 may each include a speaker and microphone port. In this illustrated embodiment, audio openings 106 and 110 each include a plurality of smaller openings where audio opening 106 can include the same or different number of smaller openings as compared to audio opening 110.

As shown, portable electronic device 100 can include at least one control button 112 disposed on a side surface of housing 122 which is to the left and perpendicular to the front surface of housing 122. Control button 112 can protrude from the side surface and may allow a user to interact with and/or deliver input to portable electronic device 100. In some embodiments, button 112 can be one of several buttons disposed next to or spaced apart from each other. Portable electronic device 100 can further include a switch 114 which can be configured as a ringer AB switch to allow a user to switch between ring and vibrate modes. In some embodiments, switch 114 can be disposed next to or above buttons 112.

Figure 1B:
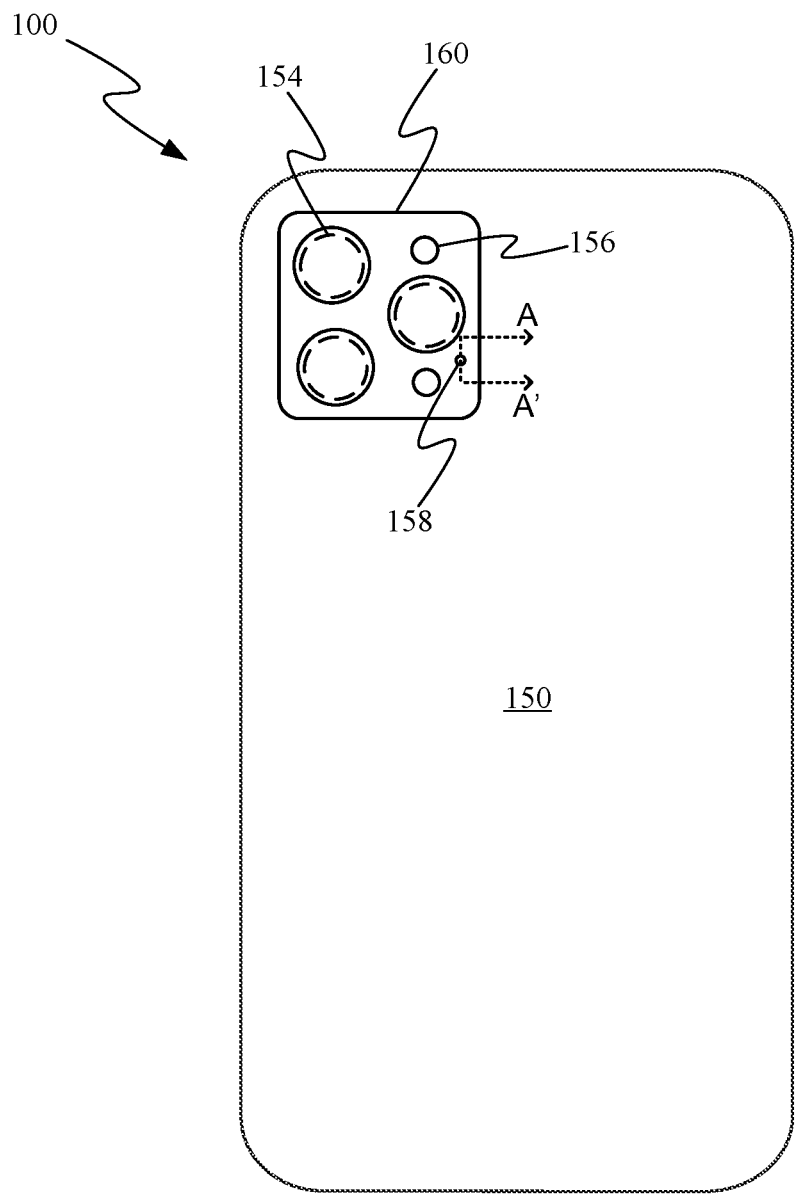
FIG. 1B illustrates a plan view of a back of the portable electronic device shown in FIG. 1A.

FIG. 1B illustrates a plan view of a rear surface 150 of an exemplary embodiment of portable electronic device 100 in which the entirety of rear surface 150 is covered with a glass layer. Rear surface 150 can including a plurality of different components disposed on a portion of housing 122, such as one or more lenses 154 each of which can be associated with a different camera, one or more light sources 156, such as a light emitting diode (LED) flash operable with the cameras, and one or more openings 158 that extend through housing 122 and can, for example, function as a microphone audio port. In the depicted embodiment, components 154, 156 and 158 are disposed near an upper left corner portion 160 of portable electronic device 100, but in other embodiments the components can be disposed at a different corner location of rear surface 150, at an upper central location or at any other appropriate location on housing 122. Additionally, in some embodiments, corner portion 160 can protrude slightly beyond the exterior surface of other portions of rear surface 150 in order to provide additional space within the housing 122 for components disposed in corner portion 160.

Figure 2:
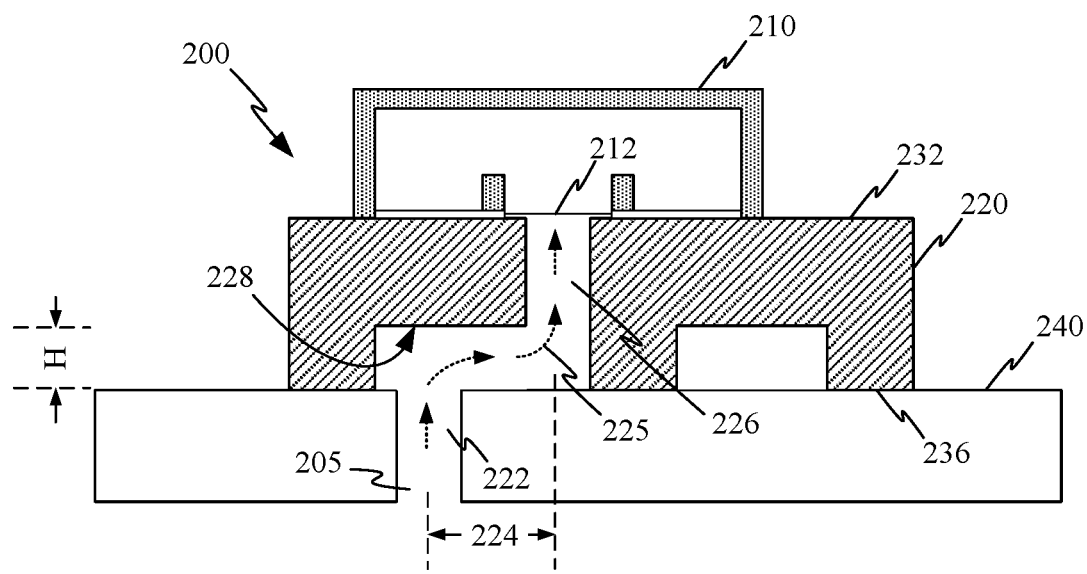
FIG. 2 illustrates a simplified cross-sectional side view of a portion of the portable electronic device shown in FIGS. 1A and 1B taken along section lines A-A in FIG. 1B that includes a microphone and bracket according so some embodiments of the disclosure.

In some embodiments an acoustic module that includes a microphone is disposed within the interior cavity formed by housing 122 behind and acoustically coupled to opening 158. As an example, reference is made to FIG. 2, which is a simplified cross-sectional view of an acoustic module 200 according to some embodiments of the disclosure. Acoustic module 200 can be incorporated into an electronic device, such as portable electronic device 100 shown in FIGS. 1A and 1B. Acoustic module 200 can include a microphone 210 and a bracket 220 that can attach the acoustic module, including microphone 210, to a wall 240 that can be part of a housing of a portable electronic device. As shown in FIG. 2, wall 230 includes an audio opening 205 that can be representative of, for example, opening 158 shown in FIG. 1B. In some embodiments audio opening 205 can be a pinhole opening having a diameter less than 2 mm or less than 1 mm or about 0.75 mm or as small as manufacturing processes allow.

Bracket 220 creates an acoustic pathway 225 represented by the dotted lines between audio opening 205 and a membrane 212 disposed in front of microphone 210. In some embodiments membrane 212 can be formed from a hydrophobic GOR-TEX material with tiny holes that allow air and audio waves to pass through but prevent liquids, such as water, from penetrating the layer. Membrane 212 can be a sensitive component that can easily be ruptured if a foreign object comes in contact with the membrane. As explained above, prior art devices typically protect membrane 212 and components of the microphone by covering audio opening 205 with a mesh or similar material. In some embodiments of the disclosure, however, there is no mesh covering over audio opening 205. Instead, in some embodiments, microphone 210 and membrane 212 are protected by bracket 220.

For example, as shown in FIG. 2 the acoustic pathway 225 created by bracket 220 and audio opening 205 includes a first channel 222 aligned with audio opening 205 and a second channel 226 aligned with membrane 212. First and second channels 222, 226 are laterally offset from each other by a lateral offset distance 224. This lateral offset results in acoustic pathway 225 being non-linear and prevents an object, such as a pin, paperclip, SIM eject tool, etc., from being inserted into audio opening 205 and rupturing or otherwise damaging membrane 212. Lateral offset distance 224 can be any distance that is sufficient to create a non-linear path from audio opening 205 to membrane 212. In some embodiments, lateral offset distance 224 is greater than the diameter of audio opening 205. The lateral offset distance 224 between channels 222 and 226 of acoustic pathway 225 is created in part by a shelf 228 of bracket 220. Shelf 228 is directly opposite audio opening 205 such that any pointed object inserted into audio opening 205 will contact and be stopped by shelf 228 thus being prevented from penetrating further into the acoustic path.

Acoustic pathway 225 can have a substantially constant cross-sectional area throughout the majority or entirety of the pathway for improved acoustic performance. Thus, in some embodiments acoustic pathway 225 can have a circular cross-section along the length of channels 222 and 226 that matches or substantially matches the circular cross-section of audio opening 205. In some embodiments, shelf 228 and the upper surface of wall 240 facing shelf 228 are substantially flat. In such embodiments, the portion of the acoustic pathway 225 extending between channels 222 and 226 can have a rectangular (including a square) cross-section that has approximately or substantially the same cross-sectional area as the diameter of channels 222 and 226.

Figure 3A:
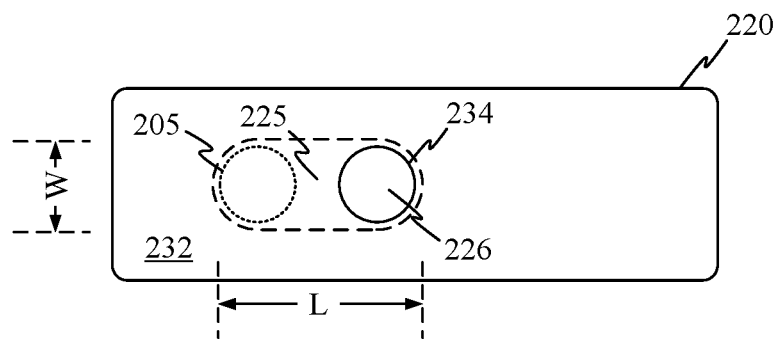
FIGS. 3A and 3B are simplified top and bottom plan views, respectively, of the bracket shown in FIG. 2 according to some embodiments.

As shown in FIG. 3A, an upper surface 232 of the bracket can include an opening 234 that is aligned with second channel 226 of the acoustic pathway. Membrane 212 (and thus the opening to microphone 210) can be positioned directly above opening 234 as shown in FIG. 2 to receive sound waves propagating through the acoustic pathway.

Figure 3B:
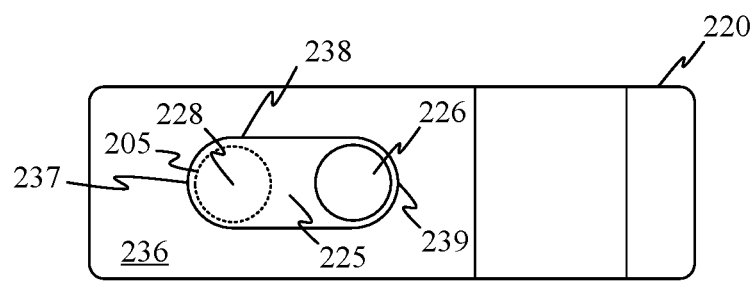

Referring to FIG. 3B, a bottom surface 236 of bracket 220 can include an opening 238 aligned with audio opening 205. Opening 238 can be in the form of a channel having a length (L) extending across bottom surface 236 from a first end 237 to a second end 239 that is greater than its width. In some embodiments, the length of opening 238 can be at least twice that of its width (W) and of its height (H). As shown in FIG. 3B, the first end of the channel can surround or otherwise encompass audio opening 205 and the second end can be fluidly coupled to second channel 226 which extends perpendicularly away from opening 238 to opening 234. In some embodiments, opening 238 can be slightly larger in width than the diameter of audio opening 205 to ensure that no part of the bottom surface 236 of bracket 220 obstructs audio opening 205 due to manufacturing tolerances.

In some embodiments, bracket 220 can be fabricated from plastic and formed by an injection molding process. Since shelf 228 is directly opposite audio opening 205, the shelf is potentially visible through the audio opening 205 and embodiments can color shelf 228 the same or a similar color as wall 240 (or an exterior surface of wall 240) for a desired cosmetic effect.

In some embodiments, the acoustic module can be included within a separate a frame that fits within a larger housing of a portable electronic device. As an example, reference is made to FIG. 4, which is a simplified exploded perspective view of an acoustic module 400 according to some embodiments. Acoustic module 400 includes a microphone 410 and a bracket 420 that can each be representative of microphone 210 and bracket 220, respectively. Bracket 420 can be a unitary structure made of solid plastic material or another suitable material. In some embodiments, bracket 420 can be an injection molded polycarbonate part formed from recycled materials.

Bracket 420 can fit within a frame 450 that can be mechanically attached to a wall 440 of the portable electronic device. Frame 450 can support multiple components, such as one or more cameras and flash modules (not shown), within the portable electronic device. Frame 450 can include first and second recesses 452, 456 separated by a bridge section 454. Bracket 420 can include footings (shown in FIG. 5 as footings 423 and 427) disposed on the bottom surface of bracket 420. Footing 423 surround opening 445 and provides a portion of the walls that define an uninhibited acoustic pathway (FIG. 5, uninhibited acoustic pathway 425) through bracket 420. The footings 423, 427 are aligned with and that fit within first and second recesses 452, 456 to guide the orientation and placement of bracket 420 into the first and second recesses 452, 456 thus facilitating assembly of acoustic module 400 within frame 450.

Figure 4:
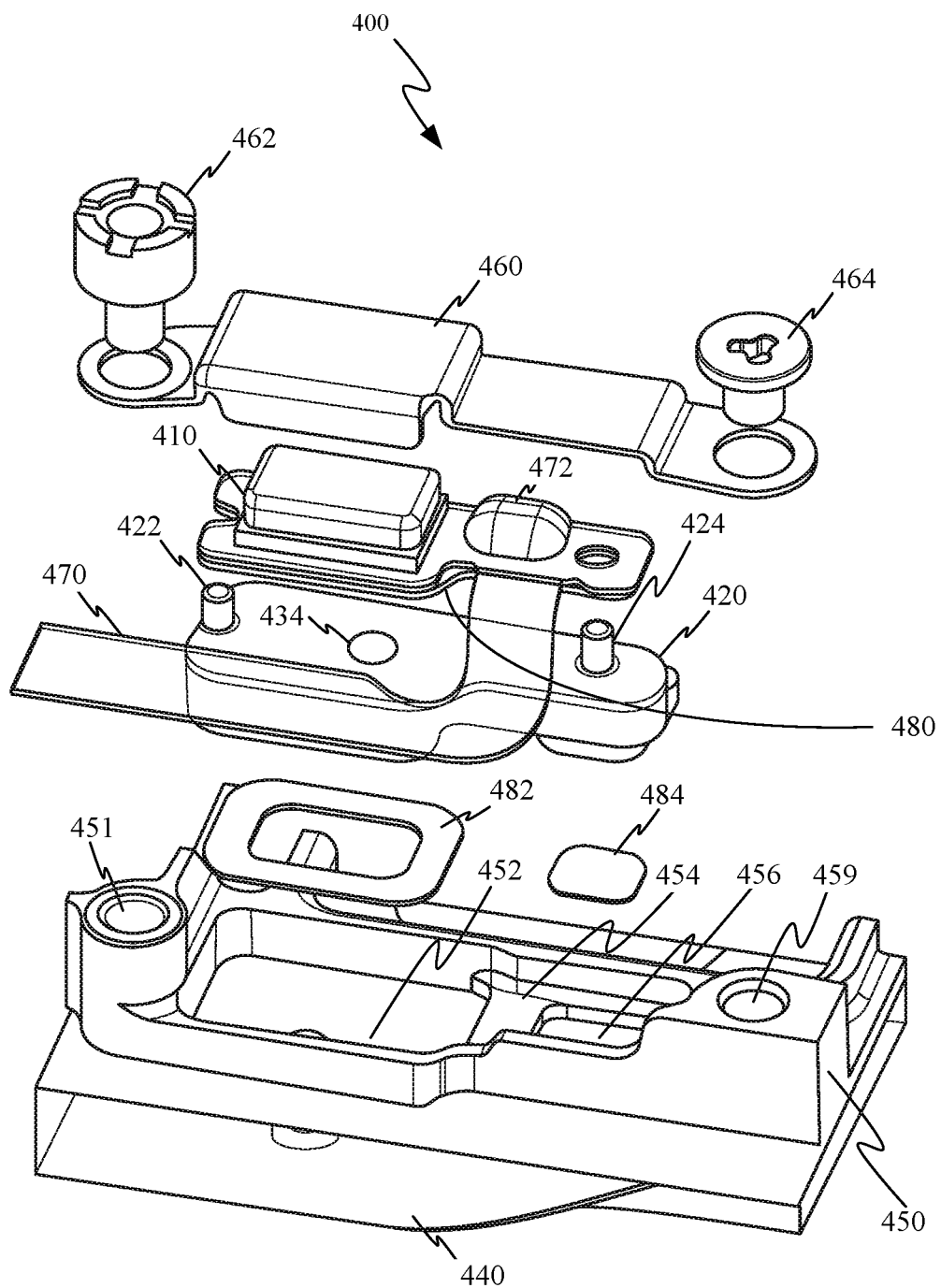
FIG. 4 illustrates an exploded perspective view of an acoustic module in accordance with some embodiments.

An adhesive layer or other appropriate mechanism can adhere bracket 420 to frame 450. For example, as shown in FIG. 4, the footings of bracket 420 can be coupled to wall 440 by first and second adhesive portions 482, 484. First adhesive portion 482 can include a central opening that, when the bracket and adhesive are mounted within frame 450, surrounds an audio opening 445 in wall 440 that forms part of the acoustic pathway formed through bracket 420 as described herein. Second adhesive portion 484 can cover a bottom portion of footing 427 of bracket 420. In some embodiments, the adhesive portions 482, 484 can be a pressure sensitive adhesive (PSA) or similar layer.

Acoustic module 400 can further include a cowling 460, a flex circuit 470 and a membrane stack 480. Cowling 460 can be disposed over microphone 410 and fasteners 462, 464 can secure the cowling 460 directly to frame 450 via screw holes 451 and 459 such that cowling 460 covers the microphone and bracket 420. In various embodiments frame 450 and cowling 460 can be made from a metal. such as aluminum or stainless steel, or a rigid or stiff plastic.

Flex circuit 470 can electrically couple microphone 410 to a controller or other audio processing or appropriate circuitry within the portable electronic device. Flex circuit 470 can include one or more components, such as a choke component that prevents unwanted radio frequencies from going to microphone 410. A protective encapsulant 472 can be applied over the components and portions of flex circuit 470 protecting the components from any potential moisture or other contaminants that may get within the acoustic module.

Bracket 420 can include two alignment pins 422, 424 that fit within a corresponding slot and hole (not numbered) in a plate portion of microphone 410 to align the microphone to the bracket. Alignment pins 422, 424 also facilitate alignment of membrane stack 480 to bracket 420 and thus to microphone 410. Membrane stack 480 can include a hydrophobic membrane (shown in FIG. 5 as membrane 412) as described above with respect to membrane 212 that protects internal components of microphone 410 from water or other liquid while allowing air (and thus sound waves) to travel through the membrane to reach a diaphragm of microphone 410. Membrane stack 480 can include adhesive layers (not shown) on top of and below the membrane to secure membrane stack 480 to both bracket 420 and microphone 410. A portion of membrane stack 480 may be suspended over opening 434 as described above with respect to opening 234 that is aligned with second channel 226 of the acoustic pathway (not shown).

Figure 5:
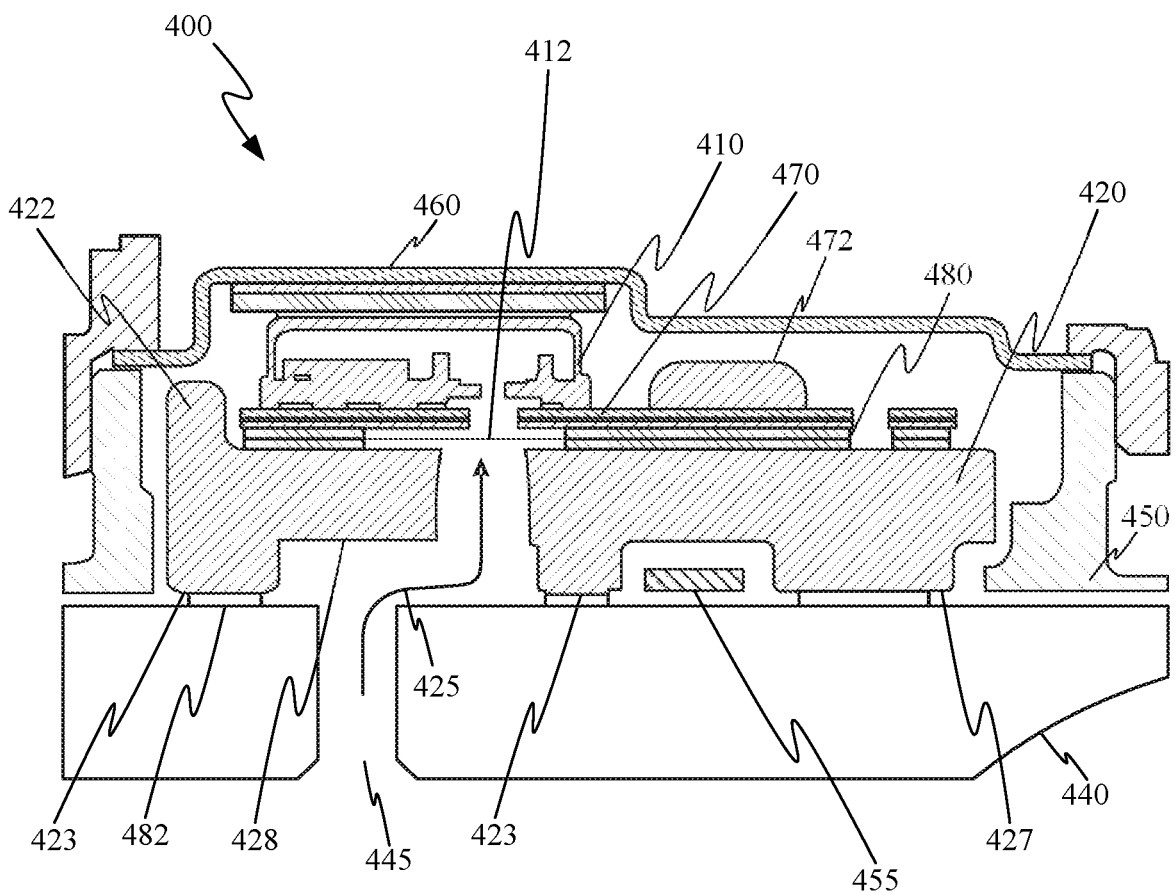
FIG. 5 is a simplified cross-sectional view of the acoustic module shown in FIG. 4 in accordance with some embodiments.

FIG. 5 is a simplified cross-sectional view of acoustic module 400 shown in FIG. 4 after it has been assembled. As shown in FIG. 5, when bracket 420 is assembled within frame 450, the bracket cooperates with an opening 445 in wall 440 to provide an uninhibited acoustic pathway 425 that is representative of acoustic pathway 225 and allows soundwaves to enter the acoustic pathway at opening 445 and travel through membrane 412 to reach microphone 410. Bracket 420 includes a shelf 428 that can be representative of shelf 228 discussed above and is directly opposite opening 445. Thus, similar to shelf 228, shelf 428 can block a foreign object, such as a paper clip or SIM eject tool inserted into 445 from reaching and damaging membrane 412.

The foregoing description, for purposes of explanation, used specific nomenclature and provided specific examples to provide a thorough understanding of the described embodiments. However, it will be apparent to one skilled in the art that the specific details are not required in order to practice the described embodiments and that the concepts disclosed herein can be applied in other use situations. For example, while some embodiments of the disclosure were described with respect to an audio opening in electronic device 100 that can be, for example, a smart phone, embodiments of the disclosure are not limited to any particular electronic device. Embodiments can be used with many different types of portable electronic or other electronic devices including, as non-limiting examples, smart watches, tablet computers, laptop computers, and smart speakers among others.

Additionally, the various aspects, embodiments, implementation or features of the described embodiments can be used separately or in any combination. Various aspects of the described embodiments can be implemented or applied in a variety of use scenarios such as systems or devices with an acoustic port or any port that that traditionally would use a cosmetic mesh. The described embodiments can create less yield loss during the manufacturing process when compared to the yield loss due to defects formed in the mesh during the cosmetic mesh manufacturing process. The described aspects, embodiments, implementations or features can be less obtrusive while provide a cleaner visual appearance. In addition, the ability to cosmetically tune the described embodiments, surfaces or features can also optimize product appearance.

Thus, the foregoing descriptions of specific embodiments are presented for purposes of illustration and description. They are not intended to be exhaustive or to limit the described embodiment to the precise forms disclosed. It will be apparent to one of ordinary skill in the art that many modifications and variations are possible in view of the above teachings.

What is claimed is:

1. An electronic device comprising:
   a housing comprising one or more walls that define an interior cavity, the one or more walls including a first wall having an audio opening extending through the first wall from an exterior surface of the housing to the interior cavity;
   a bracket disposed within the interior cavity and having first and second opposing surfaces, a first channel extending along the first surface and having a first end spaced apart from and surrounding the audio opening, and a second channel fluidly coupled to and extending perpendicular to the first channel through the second surface at a location laterally displaced from the audio opening; and
   a microphone disposed within the interior cavity and coupled to the second surface of the bracket over the second channel, wherein the bracket cooperates with the first wall to create an acoustic pathway that extends from the audio opening through the first wall, through the first channel and through the second channel to the microphone.

2. The electronic device set forth in claim 1 wherein the first channel further includes a second end opposite the first end, and the second channel extends away from the second end of first channel.

3. The electronic device set forth in claim 1 wherein the audio opening is a pinhole opening having a diameter less than 2 mm.

4. The electronic device set forth in claim 1 wherein the audio opening is a pinhole opening having a diameter less than 1 mm.

5. The electronic device set forth in claim 4 wherein the second channel is laterally displaced from the audio opening by a distance equal to or greater than the diameter of the audio opening.

6. The electronic device set forth in claim 1 wherein the first channel has a length that is at least twice as long as its width and as its height.

7. The electronic device set forth in claim 1 wherein the acoustic pathway has a substantially constant cross-sectional area from the audio opening through the second channel.

8. The electronic device set forth in claim 1 wherein the acoustic pathway has a circular cross-section through from the audio opening to the first channel and through the second channel and has a rectangular cross-section through the first channel.

9. The electronic device set forth in claim 1 further comprising a hydrophobic membrane disposed in the acoustic pathway between the bracket and the microphone.

10. The electronic device set forth in claim 9 wherein the hydrophobic membrane is disposed directly above the second channel.

11. The electronic device set forth in claim 10 wherein the microphone includes a diaphragm and a microphone opening directly above the hydrophobic membrane and fluidly coupled to a diaphragm.

12. The electronic device set forth in claim 1 wherein the bracket includes a solid surface positioned above the audio opening and partially defining the first channel directly.

13. The electronic device set forth in claim 1 wherein the bracket further includes first and second alignment pins extending away from the second surface towards the microphone and the microphone includes a plate having first and second cutouts sized to accept the first and second alignment pins.

14. An electronic device comprising:
   a housing comprising a housing wall that includes an opening extending from an exterior surface of the housing to an interior cavity defined by the housing;
   a bracket disposed within the interior cavity and having first and second opposing surfaces, the first surface including a shelf spaced apart from and positioned directly opposite the opening and a footing vertically displaced from and surrounding the shelf and coupled to an interior surface of the housing wall at a location that surrounds the opening, the bracket further including a passageway extending through the second surface and fluidly coupled to and laterally displaced from the opening; and
   a microphone disposed within the interior cavity and coupled to the second surface of the bracket, wherein the bracket creates an acoustic pathway that extends from the opening around the shelf through the passageway to the microphone.

15. The electronic device as recited in claim 14 further comprising a hydrophobic membrane disposed in the acoustic pathway between the bracket and the microphone.

16. The electronic device as recited in claim 14 wherein the acoustic pathway has a substantially constant cross-sectional area along a length of the acoustic pathway from the opening to the microphone.

17. The electronic device as recited in claim 14 wherein the opening has a diameter less than or equal to 1 mm.

18. An electronic device comprising:
   a housing comprising a wall that at least partially defines an interior cavity and includes an audio opening extending from an exterior surface of the wall to the interior cavity, the audio opening having a diameter of 1 mm or less;

a microphone disposed within the interior cavity;

a bracket coupled between an interior surface of the wall and the microphone, the bracket having a first opening formed in a first major surface and disposed directly over the audio opening, a second opening formed in a second major surface opposite the first major surface and laterally displaced from the audio opening by at least the diameter of the audio opening, and an audio channel fluidly coupling the first opening to the second opening; and a hydrophobic membrane disposed between the microphone and the bracket in an opposing relationship with the second opening, wherein the bracket cooperates with the wall to create an acoustic pathway that extends from the audio opening, through the audio channel, through the hydrophobic membrane and to the microphone.

19. The electronic device as recited in claim 18 wherein the acoustic pathway has a substantially constant cross-sectional area along a length of the acoustic pathway from the audio opening to the microphone.

20. The electronic device as recited in claim 18 wherein the first opening is part of a first channel extending along a length of the first major surface of the bracket and the audio channel through the bracket includes the first channel and a second channel extending perpendicularly away from the first channel towards the second opening.

\* \* \* \* \*